United States Patent
Panzer et al.

(10) Patent No.: US 12,265,060 B2
(45) Date of Patent: Apr. 1, 2025

(54) DEVICE AND METHOD FOR TESTING A TEST OBJECT

(71) Applicant: XARION LASER ACOUSTICS GMBH, Vienna (AT)

(72) Inventors: Nils Panzer, Vienna (AT); Wolfgang Rohringer, Vienna (AT); Lukas Balthasar Fischer, Vienna (AT)

( * ) Notice: Subject to any disclaimer, the term of this patent is extended or adjusted under 35 U.S.C. 154(b) by 775 days.

(21) Appl. No.: 17/420,305

(22) PCT Filed: Jan. 3, 2020

(86) PCT No.: PCT/IB2020/050025
§ 371 (c)(1),
(2) Date: Jul. 1, 2021

(87) PCT Pub. No.: WO2020/141479
PCT Pub. Date: Jul. 9, 2020

(65) Prior Publication Data
US 2022/0050084 A1 Feb. 17, 2022

(30) Foreign Application Priority Data
Jan. 4, 2019 (EP) .................................... 19150400

(51) Int. Cl.
*G01N 29/34* (2006.01)
*G01N 29/06* (2006.01)
(Continued)

(52) U.S. Cl.
CPC ......... *G01N 29/0645* (2013.01); *G01N 29/14* (2013.01); *G01N 29/2418* (2013.01);
(Continued)

(58) Field of Classification Search
CPC ............... G01N 29/0645; G01N 29/14; G01N 29/2418; G01N 29/243; G01N 29/32;
(Continued)

(56) References Cited

U.S. PATENT DOCUMENTS

| 5,272,923 A * | 12/1993 | Wadaka | G01N 29/42 |
| | | | 367/125 |
| 2005/0157971 A1* | 7/2005 | Juijve | G06F 1/1683 |
| | | | 385/12 |

(Continued)

FOREIGN PATENT DOCUMENTS

| CN | 103562684 A | 2/2014 |
| CN | 107024542 A | 8/2017 |

(Continued)

OTHER PUBLICATIONS

Hou Yang et al: 11 Broadband all-optical ultrasound transducers 11 , App Li Ed Physics Letters, A I p Publishing LLC, US, vol. 91, No. 7, Aug. 14, 2007 (Aug. 14, 2007), pp. 73507-73507, XP012100684, ISSN: 0003-6951, DOI: 10.1063/1.2771058 the whole document.

(Continued)

*Primary Examiner* — Mohamed Charioui
*Assistant Examiner* — Christine Y Liao
(74) *Attorney, Agent, or Firm* — Outside General Counsel, LLP; Alexander Franco

(57) ABSTRACT

The invention comprises a device (10) for testing a test object (40), comprising an excitation system (13) for generating broadband ultrasound pulses (12') in the test object, a detection system (20) for detecting ultrasound waves (21), which are generated through the broadband ultrasound pulses (12') in the test object (40) and emitted by the test object (40). The device (10) comprises a processing unit (30) for processing the detected ultrasound waves (21), while the excitation system (13) being one of a thermoacoustic emitter or a pulsed laser and the detection system (20) is a broadband detection system. The excitation system (13) comprises a modulator (11) for modulating the broadband ultrasound pulses (12'). Furthermore, the invention comprises a method for testing a test object.

21 Claims, 4 Drawing Sheets

(51) Int. Cl.
*G01N 29/14* (2006.01)
*G01N 29/24* (2006.01)
*G01N 29/32* (2006.01)
*G01N 29/46* (2006.01)
*G01N 29/50* (2006.01)
*G01N 29/265* (2006.01)

(52) U.S. Cl.
CPC ......... *G01N 29/2431* (2013.01); *G01N 29/32* (2013.01); *G01N 29/343* (2013.01); *G01N 29/46* (2013.01); *G01N 29/50* (2013.01); *G01N 29/265* (2013.01); *G01N 2291/02475* (2013.01); *G01N 2291/044* (2013.01); *G01N 2291/048* (2013.01); *G01N 2291/102* (2013.01)

(58) Field of Classification Search
CPC ...... G01N 29/343; G01N 29/46; G01N 29/50; G01N 29/265; G01N 2291/02475; G01N 2291/044; G01N 2291/048; G01N 2291/102
See application file for complete search history.

(56) References Cited

U.S. PATENT DOCUMENTS

| | | | |
|---|---|---|---|
| 2011/0046517 A1* | 2/2011 | Roth | A61B 8/465 600/587 |
| 2011/0048135 A1 | 3/2011 | Caron | |
| 2016/0165339 A1* | 6/2016 | Benattar | H04R 1/406 381/92 |
| 2017/0108472 A1* | 4/2017 | Fischer | G01N 29/343 |
| 2017/0296063 A1 | 10/2017 | Osawa et al. | |

FOREIGN PATENT DOCUMENTS

| | | |
|---|---|---|
| CN | 107174205 A | 9/2017 |
| CN | 107854176 A | 3/2018 |
| EP | 3173781 A1 | 5/2017 |
| JP | 2004-188457 A | 7/2004 |
| JP | 2008545123 A | 12/2008 |
| JP | 2012502576 A | 1/2012 |
| JP | 2012192160 A | 10/2012 |
| JP | 2016129659 A | 7/2016 |

OTHER PUBLICATIONS

Istvan A. Veres et al.: 11 Golay code modulation in low-power laser-ultrasound 11, Ultrasonics., vol. 53, No. I, Jan. 1, 2013 (Jan. 1, 2013), pp. 122-129, XP055601954, GB ISSN: 0041-624X, DOI: 10.1016/j.ultras.2012.04.006 the whole document.

Veres et al., "Golay code modulation in low-power laser-ultrasound", Ultrasonics (Apr. 24, 2012, vol. 53), p. 122-129.

Chinese Patent Office, Second Office Action with translation into English, Chinese Patent Application No. 202080007803.3 (copending and corresponding), Aug. 29, 2024, 24 Pages.

* cited by examiner

DEVICE AND METHOD FOR TESTING A TEST OBJECT

CROSS-REFERENCE TO RELATED PATENT APPLICATIONS

The present patent application is a National stage application in USA of the PCT application PCT/IB2020/050025 filed Jan. 3, 2020, which claims priority to EP application 19150400.0 filed Jan. 4, 2019, all of which incorporated herein by reference in their entirety.

FIELD OF THE INVENTION

The present invention is directed to a device for testing a test object and to a method for testing a test object.

BACKGROUND

In different industries there is a need for ongoing quality control of the produced products. In some industries, each and every product has to be tested, in particular for safety reasons, such that is guaranteed that there are for example no hidden cracks or inclusions or other material defects. There might also be the requirement to test, if a proper contact between two materials is existent; such a contact could be, e.g., an adhesive layer, or a solder connection.

In some cases, it is enough to test product samples from time to time, in some cases it is necessary to have an ongoing testing of the products. As used herein below a test object can be a product sample or a finished product. Furthermore, a test object can be a biological tissue, a blood vessel or a nerve or a structure in a tissue.

For this reason, several non-destructive testing methods have been developed. Non-destructive testing (NDT) is a broad and well-established technical field in different industries describing the inspection of materials or samples without the need of permanently influencing or even physically destroying the material or sample. A number of technologies have been developed, including Radiography, Eddy Current Inspection, Thermography, Visual Inspection, Shearography, Sonic and Ultrasonic detection techniques.

In contrast to most other technologies, Ultrasonic detection techniques are suitable for a vast range of materials and defects.

A typical device of an ultrasonic testing system as known in the state-of-the-art comprises a piezoelectric transducer (PET) or the principal of the piezoelectric transducer for both namely as ultrasound generator and as receiver.

Typically, PET is used in combination with coupling agents such as immersion liquids to couple the acoustic impedance of the sample to the acoustic impedance of the PET transducer.

Since the use of liquids is undesirable or, at times, not possible for many industrial applications, several attempts have been made to use PET without any coupling agent to send and receive airborne ultrasound. Such a configuration has a high impedance mismatch at the gas-to-solid material interface. This results in an associated reflection of the acoustic wave and thus in a very prominent signal attenuation.

For air-borne ultrasound, the ultrasound signal is strongly attenuated (reflected) at gas-to-solid interfaces as mentioned above. Therefore, the ultrasound signal becomes lower than the noise level and is as a single signal not detectable anymore.

The coupling efficiency of such airborne ultrasound to the sample and the detection limit of such air-borne ultrasound is very poor.

The sensitivity of this configuration can be improved through a high resonant design of the piezoelectric transducer but results in a limited frequency range which is usually within a few percent of the center frequency. Furthermore, such a resonant design leads to substantial prolongation of an impulse-like signal (for both generation and detection) due to post-pulse oscillations.

Such air-coupled PET transducers are available for different frequencies, usually from 50 kHz to 500 kHz, where each transducer is operating at a specific, non-alterable centre frequency.

There are two main setups in ultrasound testing: transmission mode and single-sided mode. In transmission mode, both sensor and detector are arranged at opposite sides of the material sample, whereas in single-sided mode, measurements are performed with single-sided access. Single-side mode can be done in a pulse-echo configuration or in a pitch-catch configuration. In the pulse-echo configuration, the ultrasound is typically emitted perpendicular to the surface of the test object, and the echoes from the test object or its defects are received along the same path. In pitch-catch configuration, a surface wave or a Rayleigh-Lamb wave is excited in the material of the test object; this wave can in turn be received adjacent to the location of generation.

Besides the already mentioned drawbacks of the airborne coupled PET transducers, they suffer from additional shortcomings. For a high spatial resolution, small elements are needed, whereas large elements are needed to achieve the required sensitivity.

Due to the mechanical oscillation of the sensing parts so-called ringing is caused.

Due to the inertia of the moving mass, the piezoelectric material keeps on moving for a long time after the excitation. This leads to a considerable prolonging of the signal, which is usually on the order of at least a factor of 20 compared to the duration of an electric excitation pulse. This limits the temporal resolution both in the signal excitation and detection. Echoes reflected from material defects cannot be temporally separated, and therefore cannot be detected.

Ultrasound imaging methods both in industrial material testing and medical imaging are absolutely dependent on a high signal to noise ratio (SNR) to increase imaging contrast and penetration depth. Also, the SNR is a crucial parameter in NDT to detect and distinguish material defects. Increasing the SNR has always been a development focus for ultrasound imaging techniques.

Several approaches for SNR enhancement have developed over the last years. US 2014/0291517 A1 discloses a dynamic focus adjustment which increases depth resolution by dynamically changing the focus both of the emitting and the receiving system during the measurement. U.S. Pat. No. 7,537,567 B2 discloses compounding which is a concept to increase imaging quality combining multiple independent images.

A method for signal enhancement is encoded excitation. US 2007/0239002 A1 discloses an application where encoded (or coded) excitation is already in use is medical ultrasound imaging with phased arrays. Here, several excitation sources are employed to achieve different beam angles and accomplish spatial and temporal modulation by consecutive signal emission. The functional principle is based on the fact that the emission and detection of a distinct signal pattern enables a better differentiation between the induced signal and random noise, leading to an increase of the SNR.

In air-coupled ultrasound NDT of the state of the art, i.e. a PET, encoded signal excitation is not implementable, due to prolongation the signal and to post-pulse oscillations and ringing as mentioned above.

US 2011/048135 A1 shows a method and a system for continuous laser generation of ultrasound. Said system comprises a fiber laser for emitting a continuous wave optical beam, a movable mirror for steering said optical beam and a test material, which wherein an ultrasound wave is excited by said optical beam. Said ultrasound wave is emitted from said test material and interacts with a measurement optical beam of a further continuous wave laser. Said measurement optical beam interacts with said ultrasound wave by partially deflecting said measurement optical beam. Said deflected optical beam is focused by a focusing lens to a position-sensitive photodetector.

KIM and HOU, "Broadband all-optical ultrasound transducers", Applied Physics Letters 91, 073507, 2007 shows a system and a method for high-resolution ultrasound imaging. An ultrasound signal is generated using a short laser pulse, and for ultrasound signal detection, the reflected intensity from an etalon cavity is observed. This etalon cavity is filled with a polymer layer, designed to mechanically change its thickness according to the incident acoustic ultrasonic waves. The change of the etalon cavity length, i.e. the distance between the two mirrors of the etalon lead to a change of the optical signal. This change of etalon length depends on the mechanical properties of the polymer layer, which is a function of the acoustic frequency, therefore the ultrasound detector's sensitivity response is non-linear and dependent on the incident acoustic frequency. In said design, the ultrasonic wave is incident parallel to the optical mirrors forming the etalon cavity.

At least one drawback of said discloser is, that the mentioned detection of said ultrasonic wave depends on a vibration and/or deformation of said polymer layer and therefore depends on material properties of the etalon cavity.

VERES, "Golay code modulation in low-power laser-ultrasound", Ultrasonics 53, 122-129, 2013 shows a system and a method for ultrasound detection, using a laser diode in CW (continuous wave, as opposed to pulsed wave) mode. The intensity of the laser diode is modulated according to a Golay code sequence, a technique frequently used in telecom applications. For acoustic signal detection, a laser beam is directed on the surface of the sample, to detect the movement and vibration of the sample. The reflected laser light from the sample, Doppler-shifted by the movement of the surface, is detected in a laser interferometer, known as laser Doppler vibrometer.

At least one drawback of said discloser is, that the detection of the acoustic signal depends on the optical properties of the surface, specifically on the reflective properties of the surface and the surface roughness.

Aim of the invention is to avoid at least some of the drawbacks of the prior art, in particular, to provide a device for testing a test object and/or to provide a method for testing the test object which both enhancing the SNR and/or have no ringing effects during testing.

At least some of said problems are accomplished by a device and a method according to the independent claims.

SUMMARY

In particular a device for testing a test object according to the invention comprises an excitation system for generating broadband ultrasound pulses in the test object and a detection system for detecting ultrasound waves which are generated through the broadband ultrasound pulses in the test object and emitted by the test object.

As understood within the scope of this application the term generated through the broadband ultrasound pulses means that the ultrasound pulses interact with the test object. Therefore, the detecting ultrasound waves can be generated due to an interaction of broadband ultrasound pulses within and with the test object.

As understood within the scope of this application the term generating broadband ultrasound pulses in the test object also includes generating broadband ultrasound pulses at the surface of the test object.

Furthermore, the ultrasound waves can also be generated outside of the test object, and subsequently be emitted onto the test object.

Furthermore, the device comprises a processing unit for processing the detected ultrasound waves.

The excitation system emits at least an excitation wave and is one of a thermoacoustic emitter or a pulsed laser. While the thermoacoustic emitter emits ultrasound pulses—or in other words acoustic pulses—, the laser emits a pulsed laser beam.

In case a pulsed laser is uses as excitation system, a pulsed laser beam is emitted into a sound propagating medium, e.g. air, and afterwards on and/or into the test object. The pulsed laser beam excites broadband ultrasound pulses in the test object due to the thermoelastic effect or due to rapid compression and relaxation following surface ablation.

In case a thermoacoustic emitter is used as excitation system, a broadband ultrasound pulse or a code sequence of broadband ultrasound pulses is emitted into a sound propagation medium e.g. air and/or is emitted into the test object. The broadband ultrasound pulse may change its wavelength and/or intensity in the test object at the border to the test object.

The excitation system comprises a modulator for modulating the excitation wave and therefore modulating the broadband ultrasound pulses. The broadband ultrasound pulses are modulated by the modulator before the ultrasound generation occurs. This might be due to a temporal and/or due to a spatial modulation of the excitation wave. Temporal modulation means a temporal encoding of the signal to enable signal correlation for SNR improvement. Spatial modulation means either spatial signal pattern generation to enable signal correlation for SNR improvement or the deviation of the broadband ultrasound pulses to scan the area of interest on the test object without mechanical movement of the measurement tool.

The detection system is a broadband detection system.

As understood within the scope of this application the term broadband means a frequency bandwidth of at least 1 MHz, for both, the excitation system and the broadband detection system. Thus, a large bandwidth is available, while both excitation and broadband detection system are capable to generating and receiving lower frequencies of at least as low as 100 kHz. As known by the skilled person, for compound materials like carbon-fibre-reinforced polymers, reflection and transmission of ultrasound signals is highly frequency dependent.

Air-coupled PETs have a very limited frequency bandwidth and can only be used for a specific material or a specific test object.

The use of a broadband excitation system and additionally a broadband detection system enables to use the device for different kind of materials, independent of the configuration of the device and/or the material. The requirement for coupling fluid may become obsolete.

The use of the thermoacoustic emitter or the pulsed laser as the excitation system enables to produce pulses with a short pulse length, preferably on the order of 1 µs for the thermoacoustic emitter and on the order of 10 ns for the laser excitation. Furthermore, such excitation system has no moveable parts and thus, there are no interfering ringing effects which enables to shorten pulses and pauses between single pulses.

In laser induced ultrasound testing, a pulsed laser can be used to generate broadband ultrasound waves within a test object and/or on the surface of a test object under inspection. When a collimated or focused laser pulse hits the surface of a test object, the energy of the photons is absorbed by the material which causes a heat-induced local thermal expansion and thus produces an ultrasound wave in the test object.

The Thermoacoustic Emitter, as described in EP 3 173 781 A1, is also called electro-thermo-acoustic transmitter and exploits the thermo-acoustic effect to generate broadband ultrasound pulses. The thermo-acoustic effect implies that fast sequential heating and cooling of a surface generates an ultrasound pulse in air due to interaction of the heated surface and the surrounding air molecules. Due to the absence of any moving mechanical parts, physical restrictions of transducers based on a mechanical principal of operation are solved. The broadband ultrasound pulse is propagating through the air or any other gaseous media and is subsequently introduced into the test object.

After producing the broadband ultrasound pulse in the test object, this broadband ultrasound pulse interacts with the test object and an ultrasound wave is generated, which is strongly dependent on material bulk and surface properties such as the thermal expansions coefficient, local defects, structures, layers and others. The material dependency of the ultrasound generation causes a specific frequency pattern for each material. This pattern can be considered unique.

With the use of a broadband detection system, said pattern can be detected over a huge bandwidth which enables a spectral analysis and/or the use of the device with different test objects.

This unique pattern can be exploited to reveal defect information, preferably using a spectral correlation with a reference spectrum.

Preferably the processing unit is able to execute a correlation between a reference signal and the emitted ultrasound waves. Preferably a correlation index is calculated. The reference signal is preferably the generated ultrasound pulses wherein the processing unit is preferably connected excitation system and/or the broadband detection system.

Correlating the reference signal with the measured signal, i.e. the emitted ultrasound waves, significantly increases the signal to noise ratio and reveals material defects. By correlating the emitted broadband ultrasound pulses and the received ultrasound waves, or by correlating the received ultrasound waves prior and post interaction with the test object, a signal buried in noise can be retrieved.

Preferably, the output of this correlation is a correlation index for each point on which a measurement is done. In the case of e.g. a Pearson correlation coefficient calculation, values reach from 0 to 1. A value of 0 indicates that there is no accordance between the compared parameters. A value of 1 indicates an accordance of 100%. The calculated correlation indices can be displayed like a C-Scan, where the amplitude is replaced by the value of the correlation index. The term C-Scan refers to a way of displaying measurement data of a 2-dimensional scan area, where preferably the amplitude of each point in the area is represented by a specific colour of a colour scale. Other suitable ways to display correlation data exist. They include: A-scan images (time sequence plots), B-scan images (time vs. location plots), scatter plots, correlation matrix plot, function plots, 3D plots, and other.

Said A-scan preferably comprises a single scan or in other words a single-shot measurement by using said the excitation system for generating one single broadband ultrasound pulse in the test object, where said one single broadband ultrasound pulse is afterwards detected by using said the broadband detection system. Said processing unit may afterwards perform a spectral cross-correlation of the detected signal on a selected measurement point of said test object. Such an A-scan does not comprise any scanning mode, which advantageously results in a very high voluminal of test object testing method, which is quick. In this case said test object may be a semiconductor, or a semiconductor component or an electronic chip or a wafer-based component to investigate for example soldering joints or soldering bumps and/or delamination of a mold package or defects. A-scan preferably are displayed by the amplitude and the time or frequency. In addition, said A-Scan may be displayed by a false-color image using said calculated correlation indices.

The connection between the excitation system and the processing unit enables to transmit the reference signal directly from the processing unit to the excitation system. Additionally, a connection between the processing unit and the broadband detection system enables transmitting signals directly to the detection system and/or triggering the detecting system according to a signal of the processing unit.

The broadband pulses can be in the form of a code sequence, in particular a temporal code sequence, preferably a Golay code sequence or a Barker code sequence or a Pseudo Random sequence. A sequence is of particular suitability, if its autocorrelation is equal to a Dirac function.

If the broadband pulses are introduced in the form of a sequence, the processing unit is able to compare the generated ultrasound waves with the respective code sequence and is thus able to find the respective sequence in the generated noise.

A sequence comprises a defined amount of pulses and pauses. The duration of the pulses can be the same for all pulses in the sequence or vary from pulse to pulse, which is also true for the pauses between the pulses. As both excitation systems, i.e. the pulsed laser and the thermoacoustic emitter are able to generate short pulses, the pulse length can be even shorter than 1 µs. This can be important because the signal to noise improvement due to the correlation of the coded signal might work best if the repetition rate of the signal sequence is in the same magnitude as the frequency content of the measured signal. If the pulse length is 1 µs with 1 µs pause between the pulses, the repetition rate is 500 kHz. The detection system is able to measure frequencies in the range of single Hz to several MHz, so pulse lengths and pauses of 0.5 µs are sufficient to cover this range.

Echoes, i.e. ultrasound waves influenced from material defects, or material interfaces, can be temporally separated, and therefore detected. Encoded signal excitation or detection can be successfully performed.

The use of the Barker and the Golay code is advantageous because these are both error-correcting codes which were first used in digital communication. The entire binary Golay code consists of a 12-dimensional vector space, in which each so-called code word is shifted towards the previous. The Barker code is a unidimensional perfect binary code sequence which can be 2 to 13 bits long. The Barker code with the length 7 is e.g. [1 1 1 −1 −1 1 −1]. While those codes promise the highest gain of signal to noise ratio, any other combination of signals and pauses can also be applied.

For the generation of this code sequence the laser and the thermoacoustic emitter respectively are triggered by a control unit which the device for testing a test object may have. After signal generation, the ultrasound waves are detected by the detection system which is also connected to the control unit or to the processing unit. The control unit may be part of the processing unit. In order to correlate this signal sequence, the measured signal is once measured as a reference signal. This might be a signal which is transmitted through the test object or a direct airborne signal from the emitter. Alternatively, the original signal (prior to generation) can serve as a reference signal for correlation Preferably the broadband detection system comprises at least a first membrane free microphone, in particular an optical microphone. A first embodiment of a membrane free microphone is described in EP 3 173 781 A1 which disclosure is fully incorporated herein. The membrane free microphone of EP 3 173 781 A1 is an optical microphone having no movable parts. The optical microphone directly measures the change of the refractive index in air, caused by the pressure difference within an ultrasound wave. The change of the refractive index is detected with an interferometer, a so-called Fabry-Pérot-etalon, where a laser is reflected in a cavity of two partially reflecting mirrors. The wavelength of the laser is adjusted to the distance of the mirrors to establish positive interference conditions. Changing the refractive index of the medium within the cavity changes the interference conditions and alters the transmitted intensity of the laser, which is measured by a photodiode. The refractive index within the cavity is changed due to the influence of ultrasonic waves which have a direct influence on the density of the therein enclosed medium which density has a direct influence on the velocity of the light. The mirrors of the Fabry-Pérot-etalon are fixed and non-movable. The change in transmitted (or reflected) light from the Fabry-Pérot-etalon are hence a function of the refractive index change of the cavity medium, but not of the mirror distance, because the latter is not altered. Since the change of optical refractive index of a medium, induced by acoustic pressure, is not a function of the acoustics frequency (but only of its amplitude), the transducer's sensitivity is linear over the entire detection bandwidth and not dependent from the acoustic frequency. The acoustic waves are incident orthogonal to the optical mirrors forming the Fabry-Pérot-etalon. The acoustic waves may also be incident in an angle close to orthogonal to the mirrors. However, if the acoustic waves are incident parallel to the mirrors, the detector will not detect the waves, since they are reflected from the non-movable mirrors and prevented from penetrating the Fabry-Pérot-etalon. Therefore, the incoming acoustics waves may not be incident parallel to the mirrors.

Preferably the excitation system is one pulsed laser emitting one or several wavelengths. Therewith different laser wavelengths couple into different materials with different efficiency.

Alternatively, the excitation system comprises several pulsed lasers, each emitting a single wavelength. Several pulsed lasers can be placed at different places around the test object to detect defects in the test object.

The broadband detection system of the device can comprise at least a second membrane free microphone, in particular an optical microphone. The first membrane free microphone and the second membrane free microphone can be arranged non-parallel, in particular under an angle of at least 10°, preferably under an angle of at least 45°, in particular orthogonal to each other.

Such a configuration enables to provide the spatial resolution of the ultrasonic waves from which a spatial resolution of the test object can be received, in particular, the spatial resolution of a detected defect relative to the test object can be observed.

In a preferred embodiment the laser of the membrane free microphone can be redirected through a prism. This enables to arrange the membrane free microphone in a preferred way, in particular with minimum space requirements. The arrangement of the broadband detection system may be such, that the air-spaced Fabry-Pérot etalon, where the actual broadband detection system of the ultrasound wave takes place, is directly attached—bonded or glued—to a 90° prism, so that the laser beam of the membrane free microphone incident into the air-spaced Fabry-Pérot etalon forms a 90° angle with the laser beam inside the air-spaced Fabry-Pérot etalon.

Preferably, not the transmitted laser intensity through the air-spaced Fabry-Pérot etalon is monitored as a detection signal, but the reflected laser beam intensity.

Preferably and independently of the use of a prism, the air-spaced Fabry-Pérot etalon may be coupled with an optical fibre, which serves as guidance to deliver the laser beam into the air-spaced Fabry-Pérot etalon. The same optical fibre may be used to deliver the reflected signal from the air-spaced Fabry-Pérot etalon onto the broadband detection system.

Alternatively, a second optical fibre may be used for the reflected or transmitted signal. Polarization optics such as Lambda/2 plate, Lambda/4 (Quarter-Wave-Plate (QWP)) plate, birefringent crystals, polarizers, polarization-maintaining fibres, optical circulators, optical isolators and Faraday rotators may be used to separate laser beam incident to and returning from the air-spaced Fabry-Pérot etalon. These components may be arranged between the prism and the air-spaced Fabry-Pérot etalon, or between the prism and one of the optical fibres. For instance, an incoming and an outcoming laser beam from the Fabry-Pérot etalon may be separated in two distinct laser beam paths, by subsequently arranging a fibre, a collimator lens, a birefringent crystal, a QWP and the Fabry-Pérot etalon. In this specific embodiment, two distinct optical fibres may be used, one for laser beam delivery to the Fabry-Pérot etalon, and one for guiding the laser beam back to the membrane free microphone.

The arrangement of the membrane free microphone with reference to the test object under a specific angle is caused by the specific use of the device. The angle itself enables to enhance the spatial resolution. The preferred angles at 45° and/or 90°—where the angle is formed between the straight line of the laser beam inside the air-spaced Fabry-Pérot etalon and the straight line of propagation of the ultrasound wave inside the test object—provide a simple and reproducible arrangement and furthermore simplify the correlation.

In an alternative or complementary embodiment, the broadband detection system of the device can comprise an array, preferably a two-dimensional array, of membrane free microphones, in particular optical microphones.

Such an embodiment also enables to provide a spatial resolution of the detected ultrasound waves. It also allows the parallel assessment of detected ultrasound waves at different locations. Beam forming or synthetic aperture algorithms can be performed, an assertion with respect to the topography of the detected defect in the test object can be made if necessary.

This embodiment can comprise one excitation system and a detection system having a plurality of microphones. As explained further below the embodiment can also comprise one excitation system with a plurality of excitation lasers.

The device can comprise an excitation head which is preferably connected to a fibre bundle with the excitation system. The fibres of the fibre bundle can be arranged in the excitation head in a one- or two-dimensional array, preferably in a two-dimensional array or the fibres can be moved above the test object to scan the test sample.

These configurations enable to introduce the broadband ultrasound pulses in a spatial manner. Such a configuration is advantageous for the use in medical purposes e.g. for the use in diagnostic imaging.

The laser excitation system can be moved across the object under test, to excite ultrasound waves at different locations. Therefore, another aspect of the invention is directed to the use of a device as herein described for medical purposes.

In a preferred embodiment the excitation head can be a pad, which can be laid or stuck on a patient.

This enables to introduce ultrasonic pulses over an area of the test object under which a specific defect, or if the test object is an animal or a human being, under which a specific organ is expected.

Hence in a preferred embodiment the device as herein described has an excitation head having an array of fibre bundles each one of the fibres is able to provide a laser pulse and having an array of membrane free microphones. The quantity or arrangement of membrane free microphones and fibres has not necessarily to match.

In a preferred embodiment the device comprises a housing element shielding at least the broadband detection system. The housing covers at least the detection parts of the broadband detection system. Thus, no straylight will enter into the detection parts of the broadband detection system.

Preferably the housing element additionally comprises at least the emitting part of the excitation system. Covering the detection parts of the broadband detection system as well as the emitting part of the excitation system lead to a very compact testing device.

Preferably the housing element comprises an interlock element, which is connected to an electric feedback loop. The electric feedback loop monitors the connection between the interlock element of the housing element and the test object and preferably switch off the excitation system, if disconnection between the housing element and the test object occurs. Furthermore, the interlock element is preferably a mechanical switch, a feeler, a sensing device, for example an optical sensing device or an acoustical sensing device, which interlocks the excitation laser as soon as the housing element is retrieved or moved away from the surface of the test object. The mechanical switch or push button can have the embodiment of a little wheel or glider, mounted on a spring pressing onto the surface of the test object, connected in a way that the interlock element is activated as soon as the interlock element loses its physical contact with the test object's surface. This improves the safety requirements.

In particular, the housing element comprises a separating element for separating the excitation system from the broadband detection system. The separation element comprises at least one wall, which prevents parasitic waves, e.g. structure-borne waves or air-borne waves from the first surface, to reach the broadband detection system. Therefore, interference effects between the parasitic waves and ultrasound waves from a defect or an absorber in the test object can be avoided. Furthermore, said measured signal may be easier progressed in said processing unit and several evaluation techniques may be used, like linear fits, offset-cuts, Gauss-fits and others.

The broadband detection system and the excitation system can be arranged such that the measurement in pitch-catch mode can be done or the detection system and the excitation system arranged such that the measurement in pulse-echo mode can be done.

This configuration enables to make the measurement from one side of the test object.

Preferably either the excitation system or the broadband detection system is moveable on the test object. If the broadband detection system is moving on the test object, the excitation system stays in a fixed position near the test object or vice visa. Therefore, a large area of the test object can be scanned.

Alternatively, the excitation system and the broadband detection system are jointly moveable on the test object. This configuration comprises a flexible testing system, which is able to scan test objects of different sizes.

The broadband detection system is preferably arranged in or next to the excitation head, wherein preferably the fibre bundle's end is directed through the broadband detection system. With other words, the membrane free microphones of the detection system can be combined with the fibre bundles such that excitation and detection take place at the same location.

With such a configuration the space requirements are reduced to a minimum.

Alternatively, arranging the excitation head right next to, but adjacent to the broadband detection system. A preferred distance between excitation head and detector is 5 to 10 mm. Preferably, for this embodiment, both excitation head and broadband detection system are arranged inside the same housing element. This pitch-catch embodiment allows for better temporal separation between surface-generated, slowly travelling air-coupled ultrasound wave one the one hand, and structure-coupled, fast travelling ultrasound wave on the other hand. For a test object with a thickness of at least 50 mm, the distance between excitation head and broadband detection system may be increased.

In an alternative embodiment the broadband detection system and the excitation system can be arranged such that the measurement in transmission mode can be performed.

This configuration allows measurement in transmission mode which for example can be useful for stationary embodiments of the device such as for example in the production of elongate materials.

The at least one broadband detection system or the excitation system can be brought into contact with the test object through a contact fluid.

Some test objects are insensitive with respect to contact fluid and therefore the transmittal of ultrasonic pulses and ultrasonic waves can be enhanced through the use of contact fluid.

According to another aspect, the invention is directed to a method for testing a test object, in particular executed by a device as herein described. The method comprises the steps of generating broadband ultrasound pulses in the test object with an excitation system, said excitation system is modulated and preferably being one of a thermoacoustic emitter or a pulsed laser, detecting ultrasound waves which are generated through the broadband ultrasound pulses in the test object and emitted by the test object with a detection system, processing the detected ultrasound waves with a processing unit.

The detection system is a broadband detection system.

The generation of broadband ultrasound pulses and thus the generation of ultrasound waves enables to use the method for testing different kind of materials, independent of the configuration of the device and/or the material.

Preferably, the detected ultrasound waves are correlated with a reference signal and a correlation index is calculated, said reference signal being preferably the generated broadband ultrasound pulses.

Correlating the measured signal with the reference signal significantly increases the signal to noise ratio and reveals material defects.

Advantageously, the reference signal is directly coupled to the processing unit. This enables to correlate the raw signal of the broadband ultrasound pulses and/or to trigger the processing unit based on the raw signal.

By correlating the emitted signal, namely the broadband ultrasound pulses and the received signal, namely the ultrasound waves, or by correlating the received signal prior and post interaction with the sample, a signal buried in noise can be retrieved.

The broadband ultrasound pulses can be generated in the form of a code sequence, in particular a temporal code sequence. The use of a code sequence facilitates the detection of the respective signal in the response. With other words, a correlation between the broadband ultrasound pulses and the ultrasound waves is facilitated.

The broadband ultrasound pulses are preferably generated in the form of a Golay code sequence or a Barker code sequence.

As mentioned above, these codes promise a high gain of signal to noise ratio.

Having a code sequence, with other words, a temporal sequence of pulses, echoes influenced from material defects can be temporally separated, and therefore detected. Encoded signal excitation or detection can be successfully performed In a preferred embodiment the excitation of the broadband ultrasound pulses is executed, in an array, preferably in a two-dimensional array and/or the ultrasound waves are detected in an array, preferably a two-dimensional array.

Preferably the excitation of the broadband ultrasound pulses is executed by one pulsed laser emitting one or several wavelengths. Therewith different laser wavelengths couple into different materials with different efficiency.

Alternatively, the excitation of the broadband ultrasound pulses is executed by several pulsed lasers, each emitting a single wavelength. Several pulsed lasers can be placed at different places around the test object to detect defects in the test object.

This enables to introduce the broadband ultrasound pulses over an area of the test object and thus to generate ultrasound waves over a distinct area of the test object.

Ultrasound pulse generation by a laser excitation system may be realized by exciting subsequently many optical fibres directed on the test object. Hereby, broadband ultrasound pulses are generated at different locations, distributed over the surface of the test object. Due to a potentially uneven distribution of the defect inside the test object, the generated ultrasound waves from the test object will depend on the location of the ultrasound pulse excitation. Scanning the excitation laser fibre bundle system, e.g. by means of a galvanometer mirror system, enables a fast testing device without the need to physically move the testing device over the surface of the test object, which would be associated to a certain minimal measurement time.

Another embodiment comprises in illuminating a specific spatial pattern at once, simultaneously. The excitation laser fibre bundle system may, e.g., consist of 10.000 fibres or more. A selected number of these fibres may be carrying an excitation laser pulse at the same time, hereby generating a specific spatial excitation pattern. This pattern may stay the same for subsequent pulses, or it may change.

The detection of the ultrasound waves in an array, preferably a two-dimensional array, additionally or alternatively enables to detect a specific pattern in a spatial manner, i.e. over a distinct area.

It might be advantageous to provide at least one membrane free microphone in particular a microphone as described herein. At least the second membrane free microphone can be provided and be arranged under an angle to the first membrane free microphone such that a spatial detection of the ultrasound waves is enabled.

In a preferred embodiment the broadband ultrasound pulses have a length of less than 5 µs, preferably less than 2 µs, in particular less than 1 µs. The pauses between two pulses are preferably less than 5 µs, preferably less than 2 µs, in particular less than 1 µs. Such short pulses and/or pauses enable the temporal and coded excitation and furthermore increases the SNR.

Ultrasound is sound which is often defined as sound with frequencies above 16 kHz, according to the American National Standards Institute sound with frequencies above 20 kHz.

Using an air-coupled piezoelectric transducer according to the state of the art to emit and detect a code sequence consisting of e.g. 10 pulses and 10 pauses between the pulses, results in a sequence length of 400 µs, considering a pulse and pause duration of 20 µs, which is already at the lower limit for state-of-the-art piezoelectric transducer. This results in a repetition rate of 25 kHz for the single pulses of the sequence and in a repetition rate of 2.5 kHz for the whole sequence. Since the repetition rate of 25 kHz is close to the lower limit of ultrasound it is not sufficient to increase the SNR.

Having broadband ultrasound pulses and pauses with a length of less than 5 µs results in a frequency of 100 kHz or more which increase the bandwidth of ultrasound in which measurements can be done and thus increases the SNR.

Furthermore, the high repetition rate of the whole sequence enhances the measuring speed.

In a preferred embodiment of the method the method steps as herein described are done for a first measuring point and repeated for at least a second measuring point. A correlation index for each measuring point is calculated and preferably each correlation index is plotted on a device, preferably on a display.

This enables an aerial or spatial overview over a test object, in particular it is possible to define the spatial coordinates of the found defect in the test object.

The processing unit correlates the reference signal with the time trace of the measured ultrasound waves on each measuring point. The output of this correlation is a correlation index for each measuring point. In the case of a Pearson correlation coefficient calculation, values reach from 0 to 1. A value of 0 indicates that there is no accordance between the compared parameters. A value of 1 indicates an accordance of 100%. The calculated correlation indices are displayed as a C-Scan, where the amplitude is replaced by the value of the correlation index. Other ways to display the data may be chosen according to a specific measurement situation, this include 1, 2, or 3D data plot and graph formats, color-coded plots, and other.

The broadband ultrasound pulses as well as the ultrasound waves can be transferred into a spectral signal, preferably by using a Fourier transformation, said spectral signals are correlated with each other for providing a correlation index.

By using a Fourier transformation, the detected ultrasound waves are transferred into a spectral signal. Similar to the temporal correlation explained above, this reference spectrum is correlated with the spectra on each measuring point, resulting in a correlation index for each measuring point. This index value can be displayed, according to a C-Scan.

The previously mentioned signal analysis and the signal correlation may be performed on the entire signal length, or the entire spectrum bandwidth, captured by the broadband detection system. Alternatively, the signal length, or the spectrum bandwidth, may be truncated by a start and end point, preferably selected by the operator.

Furthermore, by spectrally analysing the transmitted or reflected or emitted ultrasound waves from the test object, different properties of interest (like e.g. layer thickness, delamination, disbond, porosity, weld quality, adhesive layer quality and other) can be observed, since different properties interact with the broadband ultrasound pulses at different frequencies. While with conventional narrow-band air-coupled PETs, several scans of the test objects have to be performed subsequently at different frequencies, for a broadband system (broadband ultrasound pulses and broadband detection system), only one single scan is required.

Furthermore, this method enables to reveal changes in the spectrum which might be caused by material defects. Hence, it is a method to investigate a test object via acoustic spectroscopy, i.e. measuring alterations in transmitted (reflected) frequency spectrum, as provoked by defects inside the material or material properties. Also, this method allows to overcome the limitation of rough surfaces leading to temporal shifts in the time signal and hence limiting time sequence correlation via the Pearson coefficient. The method can be executed in one of a pulse-echo mode, pitch-catch mode or a transmission mode.

Each of the aforementioned modes has advantages. In transmission mode, both sensor and detector are arranged at opposite sides of the test object, whereas in pulse-echo mode or in pitch-catch mode, measurements are performed with single-sided access. The use of each mode depends inter alia on the shape of the test object.

The method can be executed by using a contact fluid. In particular, the broadband ultrasound pulses in the test object or the ultrasound waves which are generated through the broadband ultrasound pulses can be transmitted at least partially through a contact fluid.

The use of a contact fluid enhances the transmission of the broadband ultrasound pulses or the ultrasound waves. This is, firstly, because of the substantial absorption of very high ultrasound frequencies in air, and, secondly, due to the ultrasound impedance mismatch between the test object and air.

Beside the detection of pressure gradient, the detection device can be used to measure temperature gradients due to the detection principle of the detection device. The refractive index depends both on the pressure and the temperature of the optical medium. Thus, both changes in pressure and temperature change the optical path length which is measured with the detection device.

In a preferred embodiment the method is executed while the excitation system and/or the broadband detection system are moved above the test object. If the broadband detection system is moving on the test object, the excitation system stays in a fixed position near the test object or vice visa. Therefore, a large area of the test object can be scanned. Such configurations comprise a flexible testing system, which are able to scan the test objects of different sizes.

Further advantageous aspects of the invention are explained in the following by means of exemplary embodiments and the figures. In the drawings, it is shown in a schematic manner.

DETAILED DESCRIPTION OF THE PREFERRED EMBODIMENT

Figure 1:
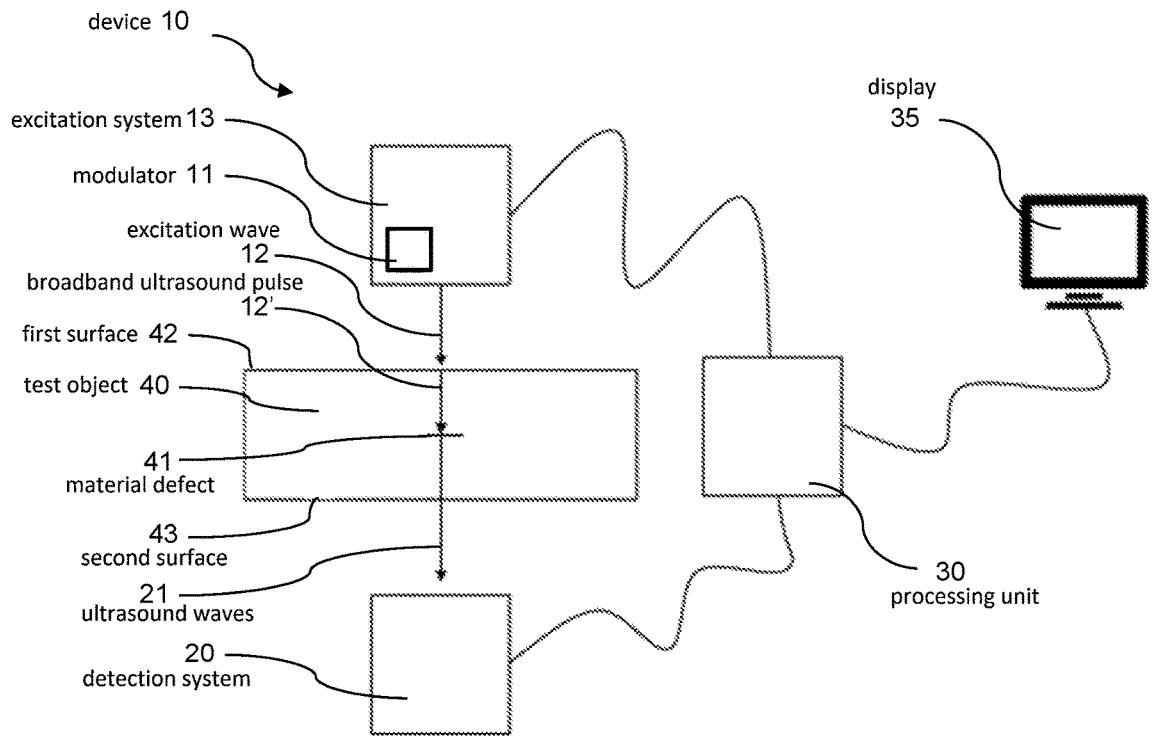
FIG. 1: A first embodiment of a device for testing a test object.

FIG. 1 shows a first embodiment of a device 10 for testing a test object 40. The device 10 comprises a pulsed laser as an excitation system 13 and an optical microphone as detection system 20. The excitation system 13 and the detection system 20 are arranged in transmission mode. The excitation system 13 comprises a modulator 11 for modulating the excitation wave 12 and subsequently the broadband ultrasound pulses 12'. The modulator 11 is able to temporally and/or spatially modulate the excitation wave 12 and/or the broadband ultrasound pulses 12'. A test object is thus arranged between said excitation system 13 and said detection system 20. The detection system 20 and the excitation system 13 having an electrical connection to a processing unit 30, i.e. they are connected through wires with the processing unit 30. The processing unit 30 is electrically connected through wires with a display 35.

Within the test object 40 a material defect 41 is shown. Said material defect 41 can e.g. be caused due to delamination, porosities or inhomogeneous material distributions.

The device 10 of FIG. 1 works as follows (one basic working principle):

The excitation system 13 emits an exaction wave 12—in case a pulsed laser, a pulsed laser beam is emitted—into a sound propagating medium which in this case is air. The pulsed laser beam hits a first surface 42 of the test object 40 and generates a broadband ultrasound pulse 12' due to the thermoelastic effect or due to rapid compression and relaxation following surface ablation. The broadband ultrasound pulse 12' propagates through the test object 40 and can be influenced by the material defect 41 in the test object 40. Induced by interfering with the material defect 41 or zone of interest, the broadband ultrasound pulse 12' generates an ultrasound wave 21 while propagating through the test object 40 to a second surface 43 of the test object 40. The ultrasound wave 21 exits the test object 40 at the second surface 43 and enters into the surrounding sound propagating medium. Afterwards, the ultrasound wave 21 is detected by the detection system 20, which in case is a membrane-free optical microphone. In this case, the membrane-free optical microphone is an optical microphone as described in EP 3 173 781 A1.

Therefore, the optical microphone detects the alteration of the density of the sound propagating medium which is caused through the ultrasonic wave 21.

In an alternative embodiment, the sound propagating medium can be e.g. inert gas or a liquid.

The processing unit 30 consists of hardware and software and is used to trigger excitation system 13 and matches the signal excitation and the signal detection and the modulation. In detail, the hardware of the processing unit 30 comprises a signal generator and a signal-analysis hardware with a signal processing unit.

The processing unit 30 is able to examine correlations, based on the measured data. This correlation can be based on a temporal, spatial, or spectral data analysis or signal analysis. The reference signal, used for correlation can be 1) the excitation signal itself; 2) scan data of a different sample, which can be C-Scan data or a time signal, where measured data of a Sample A are correlated with a Sample B; or 3) an ultrasound response, measured with the detection device 20 where the excitation system 13 is triggered by the processing unit 30 with a defined code sequence (see for example FIG. 3). The excitation system 13 is subsequently sending a first excitation wave 12, which generating a first ultrasound pulse 12' according to the code sequence onto a first measuring point (which is considered as having no material defects) of the test object 40.

Regarding point 3) of the before mentioned correlation options, the correlation is performed as in the following described:

The ultrasound response of the test object 40, namely the generated ultrasound wave 41 is saved as a reference signal.

A time signal measured on each point of the test object is correlated with the reference signal to increase SNR.

To perform a spectral analysis, the spectrum of the ultrasound response recorded at said measuring point is used as reference signal. This reference signal can be correlated with a spectrum measured at each point of the test object. These steps can be repeated for a plurality of measuring points. Signal shape differences, both in temporal and spatial direction lead to a lower correlation index. A lower correlation index indicates differences between the reference signal and the compared signal. If the reference signal is supposed to represent a healthy structure a low correlation index indicates a defect.

In case the broadband ultrasound pulses 12' are generated in an array for example with an excitation head, the measurements of a plurality of measurement points can be done simultaneously and preferably also detected in an array. Thus, the process is shortened and the evaluation of a plurality of signals can be made simultaneously.

The display 35 can be part of a computer, which is used for data recording and further analysis. Furthermore, the processing unit 30 can be part of the computer.

Figure 2:
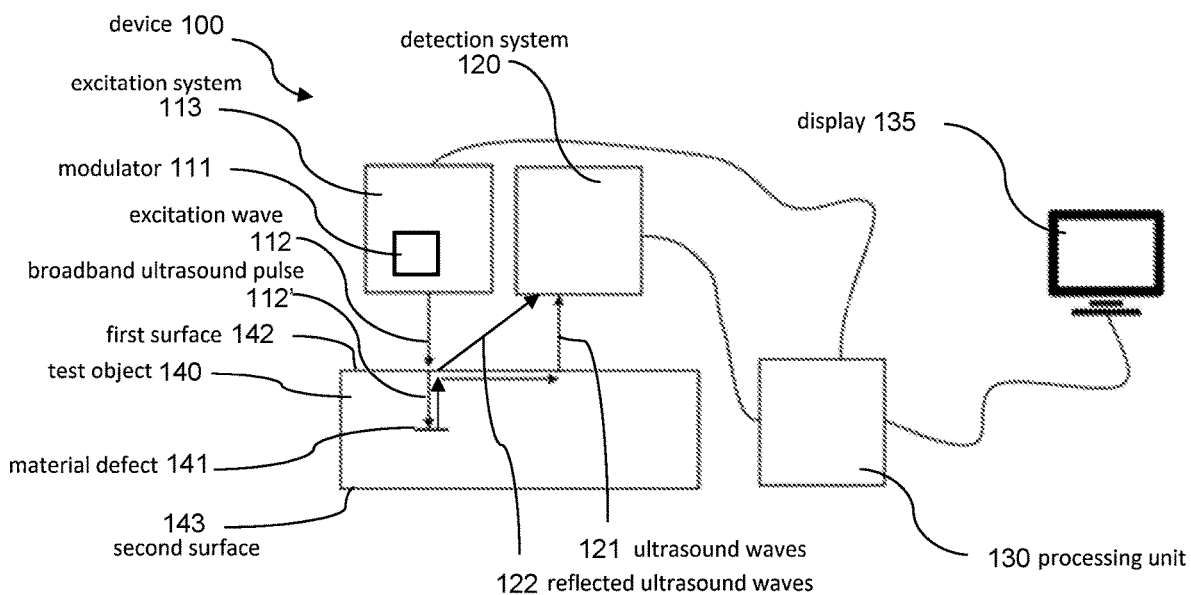
FIG. 2: A second embodiment of a device for testing a test object

FIG. 2 shows a second embodiment of a device 100 for testing a test object 140. The device 100 comprises a pulsed laser as an excitation system 113 emitting an excitation wave 112 and an optical microphone as detection system 120. The excitation system 113 and the detection system 120 are arranged side by side in pitch-catch mode on one side of a test object. The detection system 120 and the excitation system 113 are electrically connected to a processing unit 130. The processing unit 130 is electrically connected through wires with a display 135.

Alternatively, the excitation system 113 and the detection system 120 can be arranged in pulse-echo mode which means, that the detection system 120 can be directly placed in the optical path of the excitation system 113. In this embodiment ultrasound waves 122 reflected from the first surface 142 of the test object 140 as well as ultrasound waves 121 influenced by a material defect 141 are detectable in the detection system 120. The detection system 120 and the excitation system 113 having an electrical connection to a processing unit 130, i.e. they are connected through wires with the processing unit 130. The processing unit 130 is electrically connected through wires—or by wireless technology—with a display 135.

The working principle and the alternatives of the device 100 as explained to FIG. 1 are applicable to the device 100 of FIG. 2. The difference lies in the fact, that in the second embodiment according to FIG. 2 at least some of the detected ultrasound waves 121 are reflected and not transmitted as in the first embodiment according to FIG. 1.

The ultrasound wave 121 propagates through the test object 140 and can be influenced by the material defect 141 in the test object 140. Induced by interfering with the material defect 141, namely reflection, the ultrasound wave 121 is altered while propagating through the test object 140 to a second surface 143 of the test object 140. The altered ultrasound wave 121 exits the test object 140 at the first surface 142 again and enters into the surrounding sound propagating medium. Afterwards, the ultrasound wave 121 is detected by the detection system 120 which in case is membrane-free optical microphone. In this case, the membrane-free optical microphone is an optical microphone as described in EP 3 173 781 A1.

Figure 3:
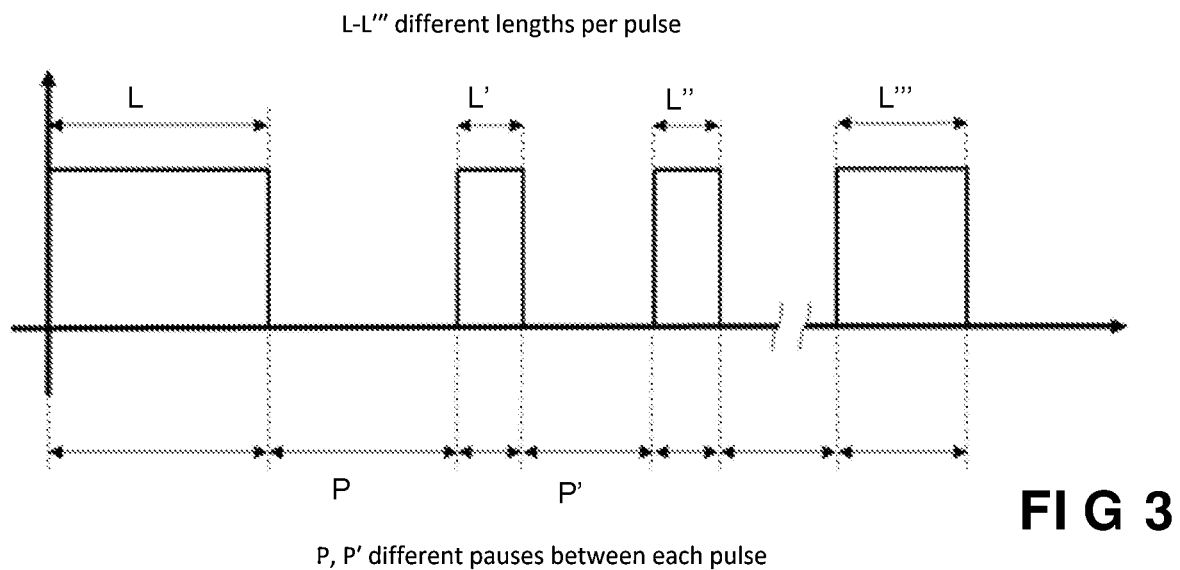
FIG. 3: A temporal code sequence

FIG. 3 shows a possible temporal code, emitted by the excitation system 13 (see FIGS. 1 and 2). This code consists of a defined number of pulses, with a defined length L, L', L", L'" per pulse and a defined pause P, P' between each pulse and a defined pulse shape.

The used pulse lengths are variable. The most significant improvement of the signal-to-noise ration can be observed if the chosen pulse length is in the same magnitude as the expected range of the signal frequency. The signal frequency can be proportional to the inverse pulse length, i.e., a short pulse will lead to a broad frequency signal, whereas a long pulse will lead to a signal containing lower frequencies in the first place.

The pulse sequence can consist of a defined number of pulses, each having the same pulse length or with different pulse lengths. The pauses between the pulses can have a constant duration for each pause or alternating durations.

Figure 4:
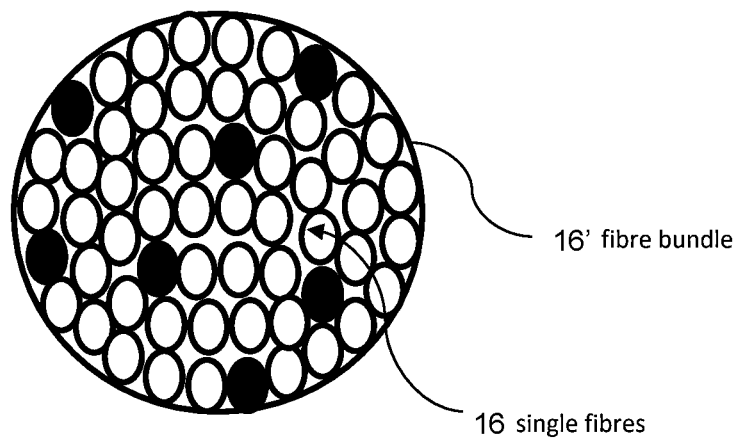
FIG. 4: A fibre bundle with several fibres

FIG. 4 shows a fibre bundle 16' with several single fibres 16 applicable to the above described embodiments of the device 10, 100 (FIG. 1 or FIG. 2) for realizing a spatially encoded signal. The spatial encoded signal is generated by the modulator 11, 111, while some of the single fibres 16 are illuminated with a laser beam (dark fibres) and some of the single fibres 16 are not illuminated (bride fibres). The fibre bundle 16' is directed to the surface of a test object (not shown) and is used to generate a specific spatial excitation pattern.

Figure 5:
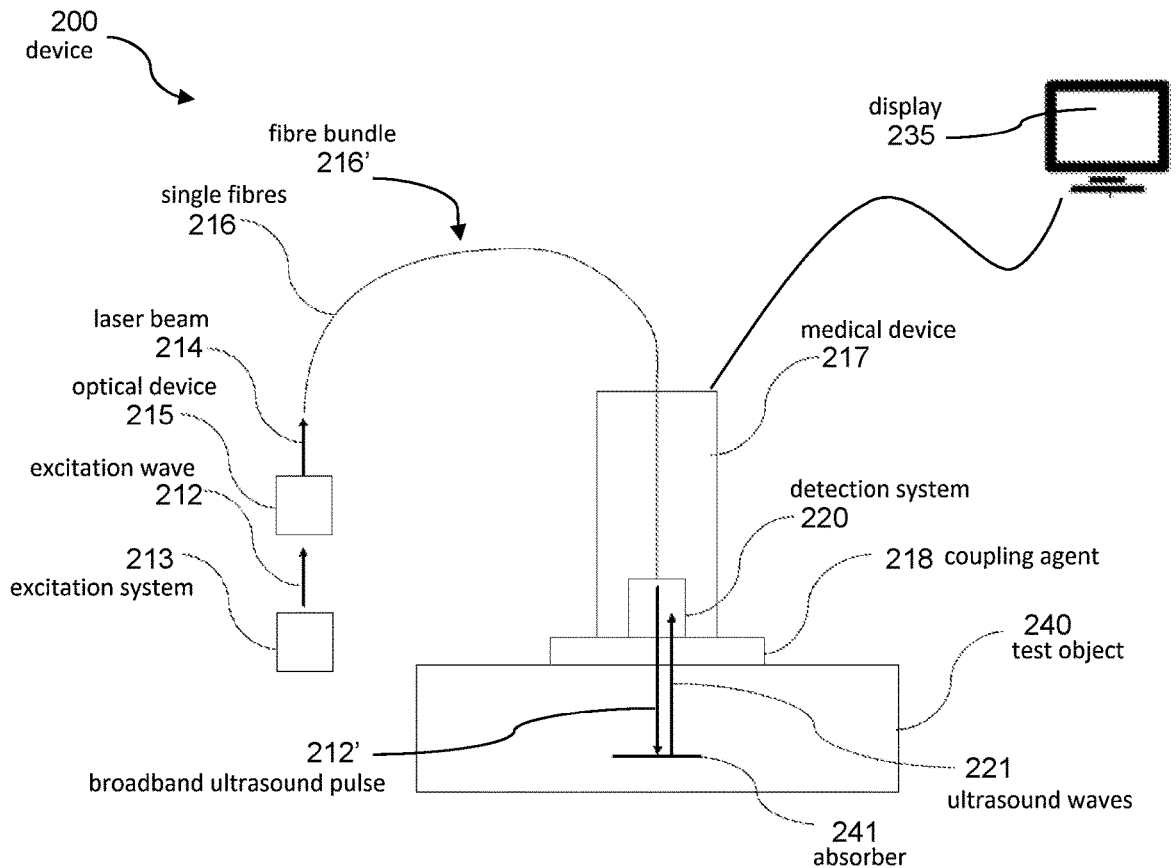
FIG. 5: A third embodiment of a device for testing a test object

FIG. 5 shows a third embodiment of a device 200 for testing a test object 240, which is basically described in the above embodiments (FIG. 1 or FIG. 2). In addition, the basic working principle of the device 200 is described in especially in FIG. 2 to FIG. 4. The excitation system 213 generates a laser pulse as excitation wave 212. The optical device 215, e.g. a collimator, redirects the laser beam 214 into each single fibre 216 of the fibre bundle 216'. The fibre bundle 216' is lead through a medical device 217, which can be for example a laparoscopic, endoscopic or thoracoscopic device. In addition, the laser beam 214 is redirected to several single fibres 2016'. The broadband ultrasound pulse 212' is generated by the laser beam 214 and is coupled into the test object 240, preferably using a coupling agent 218, e.g. a liquid, and generates a broadband ultrasound pulse 212'. Within the test object 240, the generated broadband ultrasound pulse 212' is absorbed by an absorber 241 which is generating an ultrasound wave 221 due to thermo-elastic expansion. This ultrasound wave 221 is reflected and detected with the detection device 240. The detected signal is displayed in the display 235 of the computer. The computer comprises the aforementioned processing unit in the computer.

Figure 6:
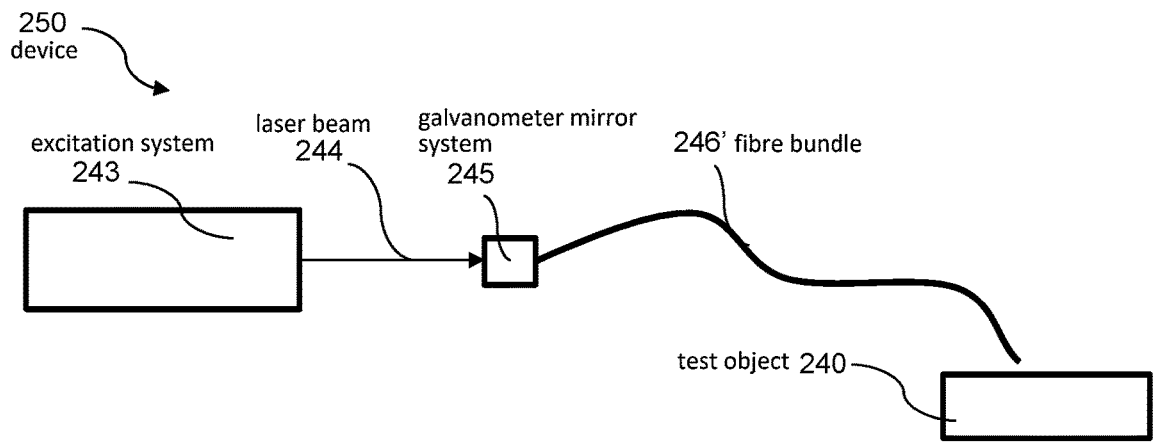
FIG. 6: A forth embodiment of a device for testing a test object

FIG. 6 shows a fourth embodiment of the device 250 for testing the test object 240, which describes basically a combination of some of the features disclosed embodiments 200 (FIG. 5) and the above described working principles. In addition, the functionality of the device 250 is described basically in FIG. 2 to FIG. 5. The excitation system 243 is a laser, which emits a pulsed laser beam 244. The pulsed laser beam 244 is sent to a galvanometer mirror system 245 an afterword to the laser bundle 216'. The laser bundle 216' is directed to the surface of the test object 240. Hereby, broadband ultrasound pulses are generated at different locations, distributed over the surface of the test object 240 (as described in FIG. 5). Due to a potentially uneven distribution of the defect inside the test object 240, the generated ultrasound waves from the test object 240 will depend on the location of the ultrasound pulse excitation. Scanning the laser fibre bundle 216', e.g. by means of a galvanometer mirror system 245, enables a fast testing device 250 without the need to physically move the testing device over the surface of the test object 240.

This embodiment allows illuminating a specific spatial pattern on the test object 240 at once, simultaneously. The laser fibre bundle 216', e.g., consist of 10.000 fibres. A selected number of these fibres may be carrying a laser pulse at the same time (see FIG. 4), hereby generating a specific spatial excitation pattern. This pattern may stay the same for subsequent laser pulses, or it may change.

Figure 7:
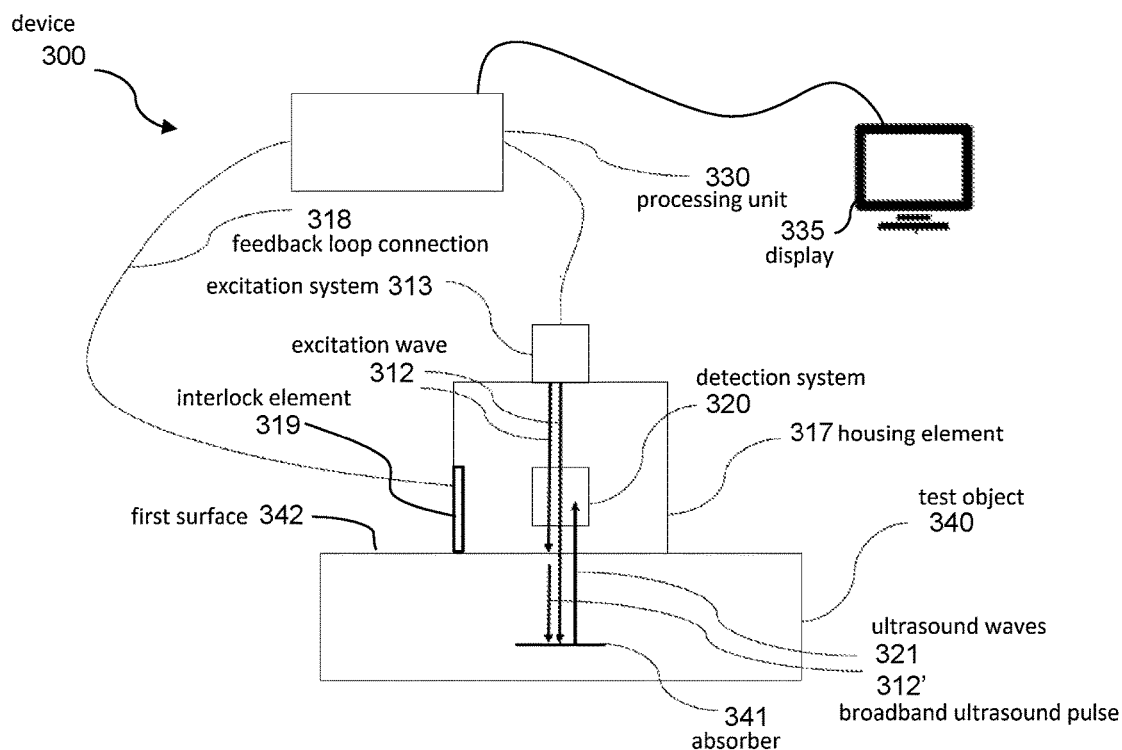
FIG. 7: A fifth embodiment of a device for testing a test object

FIG. 7 shows a fifth embodiment of a device 300 for testing a test object 340, which describes basically a combination of some of the features disclosed embodiments 10, 100, 200, 250 (FIG. 1 to FIG. 6) and the above described working principles. In addition, the functionality of the device 300 is described basically in FIG. 1 to FIG. 6. The excitation system 313 generates a laser pulse as excitation wave 312, which finally generates a broadband ultrasound pulse 312' and is either absorbed and converted into an ultrasound wave 321 at the first surface 342 of the test object 340 or by an absorber 341 within the test object 340. The housing element 317 shields the surrounding area from the reflected laser light. The housing element 317 comprises an interlock element 319 connected to the test object 340 to guarantee contact to the test object 340 by an electric feedback loop connection 318 to the processing unit 330. If the housing element 317 is disconnected with the test object 340 a signal to the processing unit 330 stops the triggering of the excitation system 313. The detected signal is displayed in the display 335 of the computer. Said interlock element 319 may comprise a distance measurement sensor, like a laser distance sensor, for measuring the distance between said test object 340 and said housing element 317.

Figure 8:
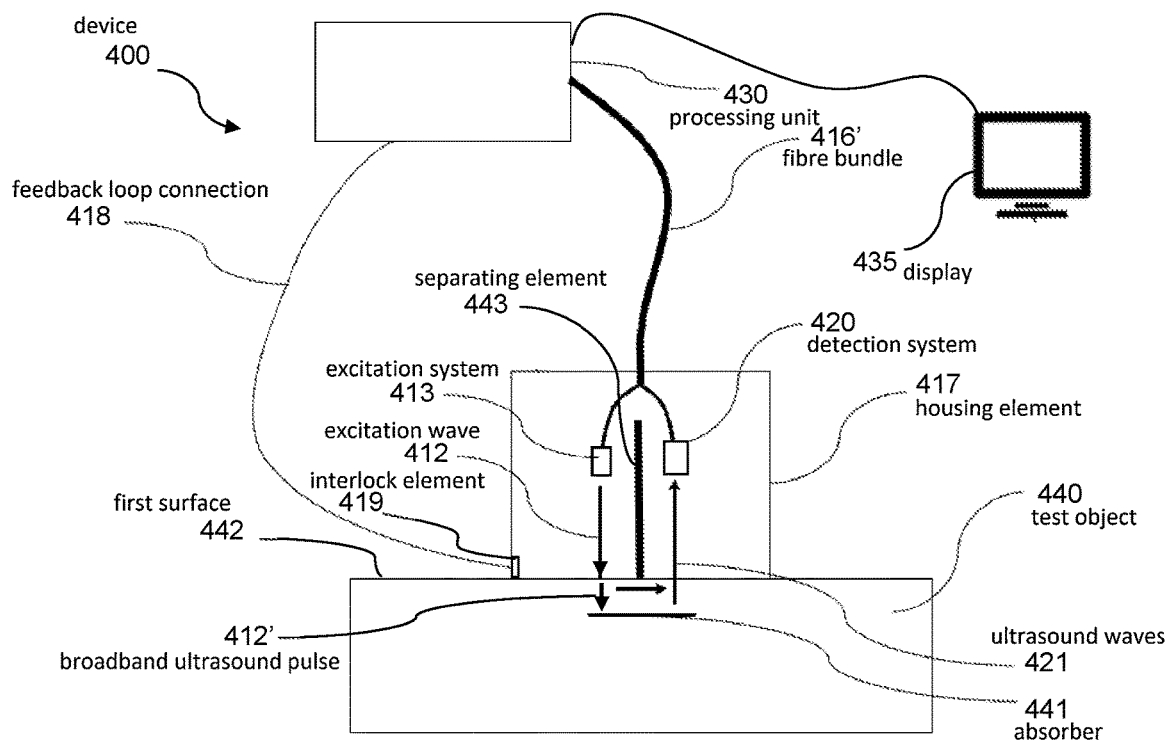
FIG. 8: A sixth embodiment of a device for testing a test object

FIG. 8 shows a sixth embodiment of a device 400 for testing a test object 440, which describes basically a further embodiment of the above described embodiments (FIG. 5 to FIG. 7). In addition, the functionality of the device 400 is described basically in FIG. 2 to FIG. 7 and the above described working principles. The excitation system 413 as well as the broadband detection system 420 are placed in the housing element 417 and are connected to the processing unit 430 via a fibre bundle 416'. The housing element 417 comprises a separating element 443, e.g. a wall, for separating the excitation system from the broadband detection system. The excitation system 413 generates a laser pulse as excitation wave 412, which generates and afterwards propagates as ultrasound pulse 412'. The ultrasound pulse 412' is either absorbed and converted into an ultrasound wave 421 at the first surface 442 of the test object 440 or by an absorber 441 within the test object 440. The separating element 417 prevents parasitic waves, e.g. structure-borne waves or air-borne waves from the first surface 442, to reach the broadband detection system 420. The housing element 417 comprises a contact element 419, like a sliding contact, which is connected to the test object 440 to guarantee contact to the test object 440 by an electric feedback loop connection 418 to the processing unit 430. If the housing element 417 is moved away from the test object 440 a signal to the processing unit 440 stops the triggering of the excitation system 413. The detected signal is displayed in the display 435 of the computer. Said contact element or interlock element 419 may comprise a distance measurement sensor, like a laser distance sensor, for measuring the distance between said test object 340 and said housing element 317.

In the embodiments of the device 10, 100, 200, 250, 300, 400 the pulsed laser is replaceable with a thermoacoustic transmitter. The thermoacoustic transmitter generates ultrasound pulses by a short time heating of a metallized glass surface and thereby induced moving of the surrounding gas molecules. The thermoacoustic transmitter emits broadband "Dirac-shaped" short broadband ultrasound pulses with a signal duration minimum of 1 μs. The emitted pulses can be single pulses or a pulse sequence. Those pulses propagate through the gas into the test object. The following signal processing is according to the description of FIG. 1 to FIG. 8.

The claims and the reference list are part of the disclosure.

LIST OF REFERENCE SIGNS 10 device
11 modulator
12 excitation wave
12' broadband ultrasound pulse
13 excitation system
16 single fibres
16' fibre bundle
20 detection system
21 ultrasound waves
30 processing unit
35 display
40 test object
41 material defect
42 first surface
43 second surface
100 device
111 modulator
112 excitation wave
112' broadband ultrasound pulse 113 excitation system
120 detection system
121 ultrasound waves
122 reflected ultrasound waves
130 processing unit
135 display
140 test object
141 material defect
142 first surface
143 second surface
200 device
212 excitation wave
212' broadband ultrasound pulse
213 excitation system
214 laser beam
215 optical device
216 single fibres
216' fibre bundle
217 medical device
218 coupling agent
220 detection system
221 ultrasound waves
235 display
240 test object
241 absorber
250 device
243 excitation system
244 laser beam
245 galvanometer mirror system
246' fibre bundle
300 device
312 excitation wave
312' broadband ultrasound pulse
313 excitation system
317 housing element
318 feedback loop connection
319 interlock element
320 detection system
321 ultrasound waves
330 processing unit
335 display
340 test object
341 absorber
342 first surface
400 device
412 excitation wave
412' broadband ultrasound pulse
413 excitation system
416' fibre bundle
417 housing element
418 feedback loop connection
419 interlock element
420 detection system
421 ultrasound waves
430 processing unit
435 display
440 test object
441 absorber
442 first surface
443 separating element
L-L''' different lengths per pulse
P, P' different pauses between each pulse

What is claimed is:

1. A device for testing a test object, the device comprising:
an excitation system for generating broadband ultrasound pulses in the test object;
a detection system for detecting ultrasound waves, said detection system being a broadband detection system, and said broadband detection system comprising at least a first membrane-free optical microphone with two partially reflecting non-movable mirrors for reflecting a laser beam in a cavity of the two partially reflecting mirrors, the ultrasound waves being generated through the broadband ultrasound pulses in the test object and emitted by the test object;
a processing unit for processing the detected ultrasound waves; and
an excitation head connected through a fibre bundle with the excitation system, wherein fibres of the fibre bundle are selectable for generating a specific spatial excitation pattern,
the excitation system being a pulsed laser and comprising a modulator for modulating the broadband ultrasound pulses.

2. The device according to claim 1, wherein the processing unit is configured to execute a correlation between a reference signal and the emitted ultrasound waves to calculate a correlation index.

3. The device according to claim 1, wherein the broadband detection system comprises a two-dimensional array of membrane-free optical microphones.

4. The device according to claim 3, wherein the broadband detection system comprises at least a second membrane-free optical microphone, said first membrane-free optical microphone and said second membrane-free optical microphone being arranged non-parallel.

5. The device according to claim 1, wherein the fibres of the fibre bundle are arranged in the excitation head in a two-dimensional array.

6. The device according to claim 1, wherein the broadband detection system and the excitation system are arranged such that a measurement in pitch-catch mode can be done or the broadband detection system and the excitation system are arranged such that a measurement in pulse-echo mode can be done.

7. The device according to claim 6, wherein the broadband detection system is arranged in the excitation head, and the fibre bundle is led through the broadband detection system.

8. The device according to claim 1, wherein the device comprises a housing element shielding at least the broadband detection system, and wherein the housing element comprises a separation element for separating the excitation system from the broadband detection.

9. The device according to claim 1, wherein either the excitation system or the broadband detection system is moveable or both are moveable on the test object.

10. A method for testing a test object, the method comprising:
generating broadband ultrasound pulses in the test object with an excitation system, wherein said excitation system is modulated;
detecting ultrasound waves which are generated through the broadband ultrasound pulses in the test object and emitted by the test object, the ultrasound waves being detected with a broadband detection system comprising at least a first membrane-free optical microphone with two partially reflecting non-movable mirrors, where a laser beam is reflected in a cavity of the two partially reflecting mirrors;
processing the detected ultrasound waves with a processing unit; and selecting fibres of a fibre bundle of an excitation head for generating a specific spatial excitation pattern.

11. The method according to claim 10, wherein the detected ultrasound waves are correlated with a reference signal and a correlation index is calculated.

12. The method according to claim 11, wherein the method steps according to claim 9 are done for a first measuring point and repeated for at least a second measuring point, a correlation index for each measuring point is calculated, and each correlation index is plotted on a display.

13. The method according to claim 11, wherein the broadband ultrasound pulses as well as the ultrasound waves are each transferred into a spectral signal, said spectral signals being correlated with each other for providing a correlation index.

14. The method according to claim 11, wherein the said reference signal being the generated ultrasound pulses or data obtained from a reference object or a measured ultrasound signal at a reference point of the test object.

15. The method according to claim 10, wherein the broadband ultrasound pulses are generated in the form of a code sequence.

16. The method according to claim 10, wherein the excitation of the broadband ultrasound pulses is executed in a two-dimensional array for providing a spatial pattern of ultrasound pulses.

17. The method according to claim 10, wherein the broadband ultrasound pulses in the test object or the ultrasound waves which are generated through the broadband ultrasound pulses are transmitted at least partially through a contact fluid.

18. The method according to claim 10, wherein the method is executed while the excitation system and/or the broadband detection system is moved above the test object.

19. The method according to claim 10, wherein the ultrasound waves are detected in a two-dimensional array.

20. The method according to claim 10, wherein the method is executed while the broadband detection system is moved above the test object.

21. A device for testing a test object, the device comprising:
 an excitation system for generating broadband ultrasound pulses in the test object;
 a detection system for detecting ultrasound waves, said detection system being a broadband detection system, and said broadband detection system comprising at least a first membrane-free optical microphone with two partially reflecting non-movable mirrors for reflecting a laser beam in a cavity of the two partially reflecting mirrors, the ultrasound waves being generated through the broadband ultrasound pulses in the test object and emitted by the test object;
 a processing unit for processing the detected ultrasound waves; and
 an excitation head connected through a fibre bundle with the excitation system, wherein a set of plural fibres of the fibre bundle is selectable for generating a specific spatial excitation pattern,
 the excitation system being a pulsed laser and comprising a modulator for modulating the broadband ultrasound pulses, wherein the excitation system emits a temporal code, consisting of a defined number of pulses, with a defined length $L, L', L'', L'''$ per pulse and a defined pause $P, P'$ between each pulse and a defined pulse shape.

* * * * *